Feb. 4, 1947.    W. D. MOUNCE    2,415,364
LOGGING BORE HOLES
Filed Dec. 29, 1941    2 Sheets-Sheet 1

Whitman D. Mounce INVENTOR.
BY J. G. McKean
ATTORNEY

Feb. 4, 1947.  W. D. MOUNCE  2,415,364
LOGGING BORE HOLES
Filed Dec. 29, 1941  2 Sheets-Sheet 2

Whitman D. Mounce INVENTOR.
BY J. G. McKean
ATTORNEY

Patented Feb. 4, 1947

2,415,364

UNITED STATES PATENT OFFICE 2,415,364

LOGGING BORE HOLES

Whitman D. Mounce, Houston, Tex., assignor to Standard Oil Development Company, a corporation of Delaware Application December 29, 1941, Serial No. 424,802

6 Claims. (Cl. 175—182)

1

The present invention is directed to the electrical logging of bore holes.

In the electrical logging of wells it is often possible to differentiate between earth formations by making measurements of impedance or resistance between electrodes of several different spreads or configurations when it is impossible to distinguish such formations when using only a single spread for the exploring electrodes. It is conventional to have an electrical conductor between each electrode and recording apparatus arranged at the surface of the earth. If an individual insulated conductor is employed for each electrode or each pair of electrodes, it is necessary to employ a large and bulky cable in order to make measurements with several different spreads or configurations of electrodes in a single run. The difficulty in handling a cable containing a number of insulated electrodes as well as its initial cost makes it extremely desirable to employ a cable containing only a single electrical conductor when logging bore holes.

It is known to the art to employ a multi-electrode system with a single conductor cable. In my copending application Serial No. 235,747, now U. S. Patent No. 2,376,168, issued May 15, 1945, there is disclosed a system of transmitting an alternating current signal from a pair of electrodes and a direct current signal from another electrode by means of a single insulated conductor. To obtain measurements with a plurality of spreads when using such a system, however, it is necessary that the electrode configuration be changed at the surface of the earth and that a new run be made for each spread.

It is an object of the present invention to devise a means for making the measurements of earth resistance in a bore hole with several different spreads or configurations of electrodes in a single run and to transmit the signals obtained to the surface of the earth through a cable having only a single insulated conductor.

A further object of the present invention is to transmit a plurality of alternating current signals and a signal indicating natural earth potentials while logging bore holes.

Still another object of the present invention is to log bore holes, utilizing a cable having only a single insulated conductor for lowering the movable portion of the apparatus into the bore hole,

2 transmitting power to the movable unit, transmitting several independent measurements from the movable unit to the surface of the earth, and using carrier frequency in transmitting the several independent measurements.

A further object of the present invention is to utilize carrier frequencies for transmitting signals in logging bore holes and to transmit a reference signal and an indicating signal on each carrier frequency.

Other objects and advantages of the present invention may be seen from a reading of the following description taken in conjunction with the drawings in which Fig. 1 is an elevation of an electrode carrier with a plurality of electrodes and connections to surface equipment;

Figure 1:
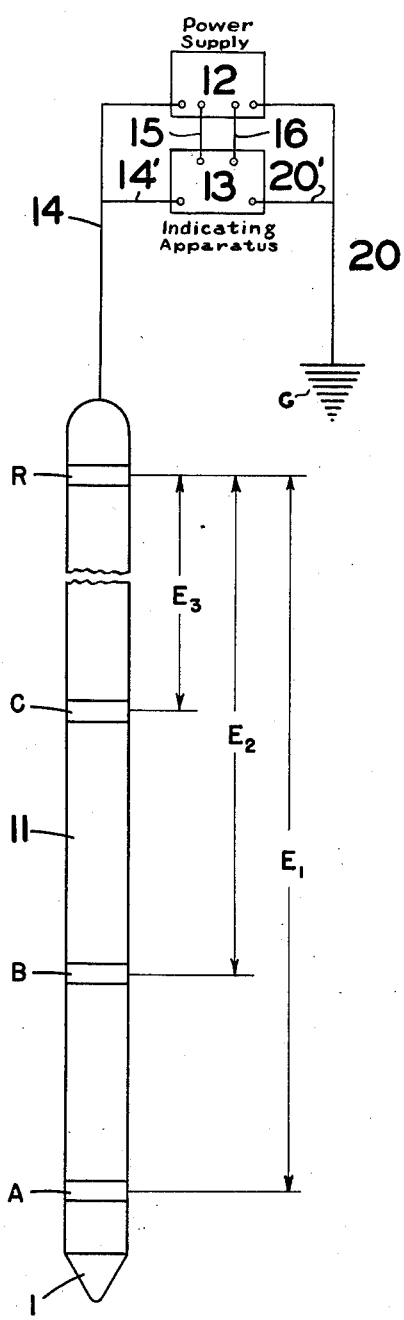

Referring specifically to the drawings, and first to Fig. 1, an electrode carrier 11 is provided with contacts or electrodes A, B, C and R, longitudinally spaced along the carrier 11. In addition, the tip of the carrier is provided with an electrode designated as I. At the surface of the earth is arranged a contact or electrode G and a generator 12 capable of producing a substantially constant alternating current. The surface indicating equipment designated by numeral 13 is arranged between generator 12 and ground G, while cable 14 is arranged to carry current from generator 12 to electrode I.

The alternating current supplied to electrode I flows back through the earth to surface electrode G causing alternating current potential differences to be set up between reference electrode R and other electrodes A, B and C. These potential differences are indicated as $E_1$, $E_2$ and $E_3$ in Fig. 1. The various values $E_1$, $E_2$ and $E_3$, when multiplied by suitable constants, give a measure of earth resistance as a function of the electrode spreads. In a typical inhomogeneous earth it is found that there is a substantial variation of resistance with spread, which is a valuable clue to the fluid content of the formations being logged.

Figure 2:
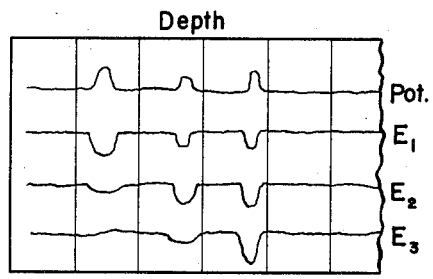
Fig. 2 illustrates the general type of record obtained from the apparatus shown in Fig. 1.

In Fig. 2 is schematically indicated the record which may be obtained by using the electrode spread as shown in Fig. 1. From this figure it will be evident that the potential differences $E_1$, $E_2$ and $E_3$ differ substantially, and that these differences will be of benefit in the determination of the character of the formations penetrated. In addition to the various alternating current potentials the natural earth potential is also plotted on Fig. 2, as designated thereon by Pot. It will be apparent, as the description proceeds, that the present invention is by no means limited to a specific number of electrode spacings and, if desirable, a larger or smaller number of electrodes than shown in Fig. 1 may be employed.

According to the present invention, a special system of carrier frequencies is employed to transmit a plurality of alternating current voltages (such as $E_1$, $E_2$ and $E_3$) from the bore hole to the surface of the earth where they are recorded. Carrier systems have heretofore been used with respect to communication systems, but these carrier systems have at least two objectionable features which prevent their employment for logging bore holes. The first objectionable feature is the physical dimensions of the apparatus employed in the communication system. When logging bore holes apparatus necessarily must be lowered into the bore hole and the carrier systems used in communication work have such dimensions that it would be extremely difficult, if not impossible, to arrange the apparatus in the limited space available. Another objection to known carrier systems is that they do not offer any compensation for the attenuation of the circuit which necessarily occurs in the utilization of high carrier frequencies and a cable which must be unrolled from a reel in the well logging operations.

The objectionable features of the carrier systems known to the art are eliminated in the device of the present invention which allows carrier frequencies to be used in logging bore holes and enables any changes in the circuit to be compensated in the measurements.

Figure 3:
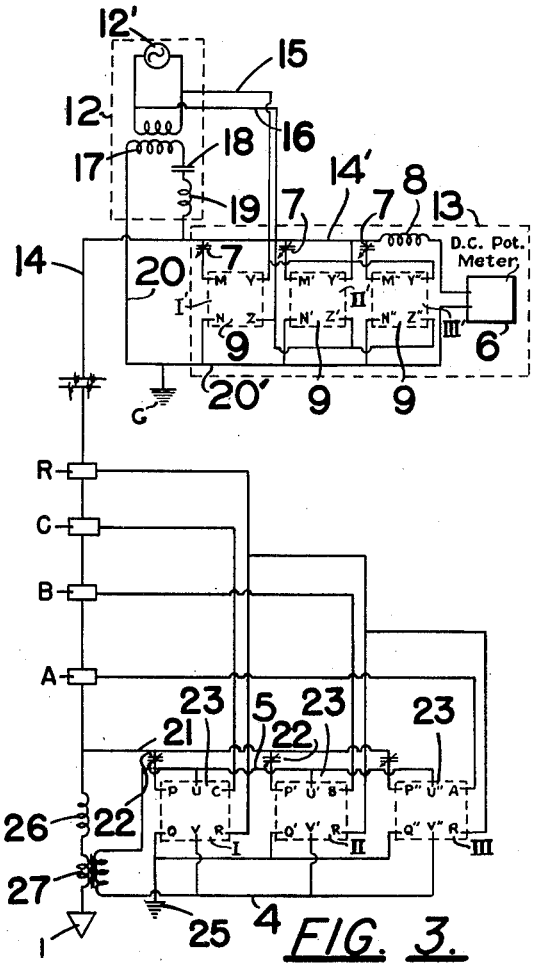
Fig. 3 is a diagrammatic view showing generally the circuit employed in the device shown in elevation in Fig. 1.
Figure 4:
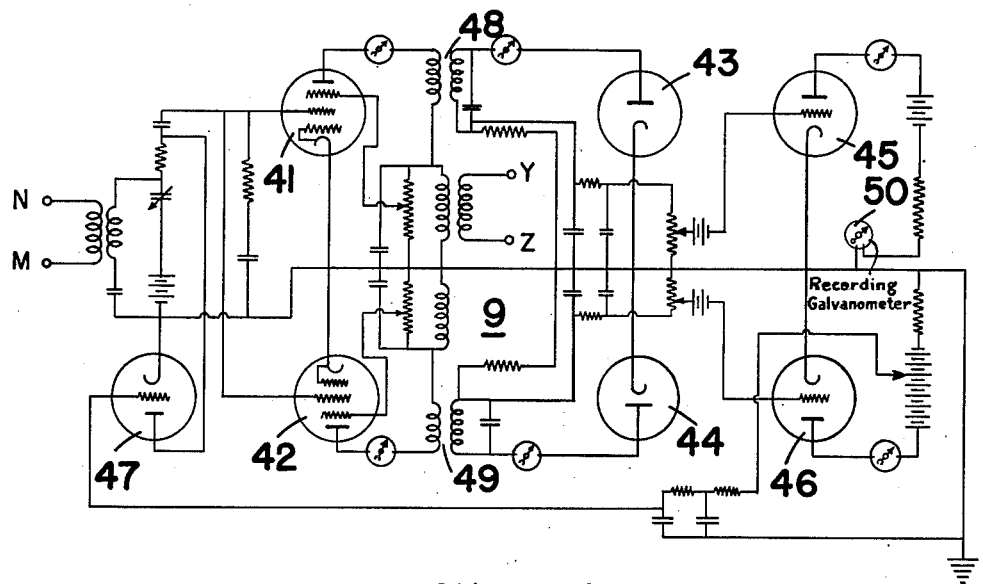
Fig. 4 is a view showing in detail a portion of the surface apparatus shown schematically in Fig. 3.
Figure 5:
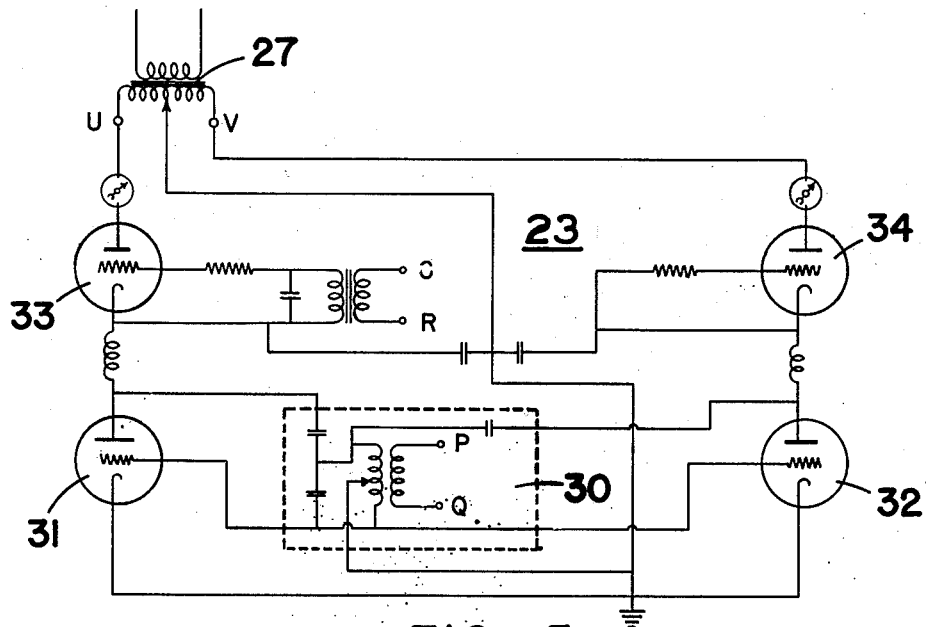
Fig. 5 is a view of a portion of the apparatus to be included in the electrode carrier and shows in detail a portion of the apparatus which is shown schematically in Fig. 3.

Turning now to Figs. 3, 4 and 5, it may be stated that Fig. 3 shows an assembly of apparatus with three modulators adapted for arrangement in the electrode carrier, the modulators being designated by I, II and III. At the surface of the earth, three corresponding detector systems are arranged designated by I', II' and III'.

The frequency alternating current produced by generating means 12', for example, 60 cycles per second, is used to energize both the oscillator modulator and detector systems. The detector system is arranged at the surface of the earth and includes three demodulator sections 9 which are designated I', II' and III'. Each section 9 is connected to conductor 14 through branch 14' and to ground G through conductors 20' and 20. The oscillator modulator system is adapted to be moved along the axis of the bore hole and includes 3 sections 23 which are designated I, II and III. The demodulator sections I', II' and III' receive power through terminals YZ, Y'Z' and Y"Z", resopectively, through conductors 15 and 16 connected to power supply 12, while the oscillator modulator sections I, II and III receive power through terminals UV, U'V' and U"V", respectively, said terminals being connected to transformer 27 through conductors 4 and 5. From generating means 12' leads 15 and 16 may be connected to points Y, Y' and Y"; Z, Z' and Z" of the detector system. In addition, generating means 12' is connected to a transformer 17 which has one end of its secondary connected to cable 14 through condenser 18 and choke 19, and the other end of the secondary connected to ground G through conductor 20.

The low frequency alternating current produced by generating means 12' is transmitted down cable 14 and is distributed to the plurality of oscillator modulator systems through transformer 27. The oscillator modulator systems are designated by the numeral 23 and may be constructed exactly alike. However, in order to distinguish these several systems, the sections shown in the drawing are designated by I, II, III. Oscillator modulator system I receives its power from transformer 27 through connecting terminals UV. In like manner oscillator modulator system II receives its power through terminals U'V' and oscillator modulator system III receives its power through terminals U"V".

Conductor 21 transmits high frequency signals from oscillator modulator systems I, II and III to conductor 14, the signals from the various units passing through condensers 22 to conductor 21. A radio frequency choke 26 is arranged in conductor 14 between the point of its connection with conductor 21 and electrode 1 in order to prevent high frequencies from units 23 being grounded by electrode 1.

The natural earth potential may be indicated by meter 6 arranged at the surface of the earth. It will be evident that the natural earth potential is transmitted through electrode 1 upwardly through units 27, 26, conductor 14, choke 8 and meter 6 with the circuit completed through conductor 20, 20' and ground G. Condensers 22 prevent flow of direct potential from conductor 21 into units 23 while at the surface of the earth condensers 7 prevent flow of direct current from conductor 14' into units 9. Choke 8 arranged in conductor 14' prevents alternating currents from affecting meter 6. The measurement of natural earth potential is itself well-known to the art and, accordingly, the portion of the apparatus employed for this purpose will not be described in any greater detail.

In Fig. 4 is shown the wiring diagram of a suitable demodulator section 9. Several sections are indicated in Fig. 3 by I', II' and III' and it will be understood that the demodulator shown in Fig. 4 represents a suitable embodiment which may be utilized in the surface equipment. The embodiment shown in Fig. 4 has terminals designated by MN and YZ and so corresponds to section I' in Fig. 3 but it will be understood that the sections are identical and the same wiring diagram may represent section II' by designating the terminals M'N' and Y'Z', respectively, or may represent section III' by designating the terminals M"N" and Y"Z". In like manner, the oscillator and modulator section shown diagrammaterially in Fig. 5 represents a suitable embodiment to be arranged in the electrode carrier and may be fitted in the section designated by I, II or III in Fig. 3. The embodiment shown in Fig. 5 has the various terminals designated by PQ, CR and UV, respectively, and so corresponds to section I of Fig. 3, but it will be understood by designating these terminals P'Q', BR, U'V' this diagram may be used to represent section II and similarly by designating the terminals P''Q'', AR, U''V'' the diagram may be used to represent section III. It will be evident that the number of demodulator and oscillator and modulator sections provided should correspond with the number of carrier circuits it is desired to utilize.

Referring now specifically to Fig. 5, the carrier frequency oscillator circuit 30 is connected to two oscillating vacuum tubes 31 and 32 the plate voltages of which are supplied through modulating tubes 33 and 34 by transformer 27. The center tap of transformer 27 is connected to the ground as are the cathodes of tubes 31 and 32. The plate voltages of the oscillator modulator groups 31, 33 and 32, 34 are thus 180° out of phase, each group being alternatively operative during the positive half cycle of the voltage received from transformer 27 and inoperative during the negative half cycle. During the half cycle in which 31 and 33 are operative the carrier ampliutde of oscillating tube 31 is determined by the effective resistance of the modulator 33 which, in turn, is determined by the voltage impressed on its grid.

The current passed through the earth from eelctrode 1 to electrode G at the surface of the earth is necessarily in phase with that supplied by transformer 27. Accordingly, the carrier output of the oscillating tube 31 is determined by the potential difference across the electrodes to which the apparatus is connected. In Fig. 5, C and R indicate that the oscillator and modulator section correspond to that indicated by I in Fig. 3 and is connected across electrodes R and C, and that the carreir output of the oscillating tube will correspond to voltage $E_3$. Obviously, however, other pairs of electrodes will be similarly connected to other modulator-oscillator sections.

During the half cycle in which oscillator 32 and modulator 34 are operative, the carrier frequency amplitude is not affected by the voltage variations in the earth, but is held fixed in accordance with the constants in the circuit except for variations which may occur in the attenuation of the conductor to the surface of the earth. Hence, the carrier alternately transmits a signal determined by earth voltage plus conductor attenuation and alternately a reference determined by conductor attenuation.

Reference will now be made to the diagram shown in Fig. 4. The demodulator section arranged at the surface of the earth which corresponds to the oscillator and modulator section arranged in the electrode carrier has its input tuned in resonance with its corresponding oscillator. Relating Fig. 5 with Fig. 4 it may be stated that the demodulator section has its input tuned in resonance with ocsillator circuit 30. The plate voltages of its carrier amplifier tubes are supplied by the same source of power which passes the current through the earth. The tubes 41 and 42 are alternately operative and inoperative in phase with oscillators 31 and 32. Accordingly, tube 41 amplifies that part of the carrier which is controlled by the voltage $E_3$ picked up by the electrodes in the earth (from oscillator 31 and modulator 33) and tube 42 amplifies the part of the carrier which is the reference from oscillator tube 32 and modulator tube 34. Having thus separated the signal and the reference they are passed through tuned transformers 48 and 49 to respective diode rectifiers 43 and 44, and the resulting direct current is filtered and passed to direct current amplifier tubes 45 and 46.

A recording galvanometer 50 is connected to the output of 45 which carries the signal (proportional to the voltage $E_3$) and the output of 46 is passed to an automatic volume control tube 47 which controls the input to both carrier amplifier tubes 41 and 42. Hence, the gain of the amplifiers is varied inversely as the line attenuation varies, and any error which would have resulted in the measure of the earth voltage $E_3$ by galvanometer 50 is automatically compensated.

It may be noted that in the circuits in Figs. 4 and 5 various electrical units, such as condensers and resistances, are indicated by conventional symbols without being specifically referred to or designated by numerals. These various units are employed in accordance with the usual electrical practice and their use is familiar to the workman skilled in the art. Accordingly, a detailed description of such units is believed unnecessary.

For the measurement of other voltages across pairs of electrodes, such as $E_1$ and $E_2$, etc., similar circuits may be used with the oscillator circuits 30 arranged in the electrode carrier 11 tuned to various frequencies, and each corresponding carrier frequency circuit at the surface of the earth tuned in resonance with its corresponding oscillator circuit 30. In practice, it has been found convenient to use frequencies of 13, 17, 22 and 27 kilocycles when it is desirable to transmit signals over four different channels. It will be understood that any frequency range which may be transmitted by the cable actually employed in lowering the movable part of the apparatus is suitable when practicing the present invention.

While I have disclosed a specific embodiment of the present invention it will be apparent to the skilled worker that various changes may be made without departing from the scope of the invention, and it is accordingly my intention not to be limited to the specific disclosure herein, but only in accordance with the hereto appended claims.

I claim:

1. In the logging of a borehole, the steps of producing power in the form of an alternating current at the surface of the earth and transmitting said current into a borehole, employing said current within the borehole to produce a carrier frequency of a substantially greater frequency than the alternating current, modifying within the borehole the carrier frequency generated during one-half of each cycle of said alternating current in accordance with a characteristic of said borehole to constitute an indicating signal, maintaining the carrier frequency generated during the other half of each cycle of said alternating current wholly free from varying earth characteristics to constitute a reference signal, transmitting the indicating and reference portions of the carrier frequency to the surface of the earth and amplifying the indicating portions of the carrier frequency as a function of the reference portions of the carrier frequency.

2. In the logging of a borehole, the steps of producing power in the form of an alternating current at the surface of the earth, transmitting said power within a borehole and there employing it to produce a carrier frequency of a substantially higher frequency than the alternating current, modifying within the borehole portions of the carrier frequency produced during one-half of each cycle of the alternating current in accordance with a varying earth characteristic of the borehole, to constitute an indicating portion, maintaining the carrier frequency produced during the other one-half of each cycle of the alternating current wholly free from varying earth characteristics to constitute a reference portion, transmitting the indicating and reference portions of the carrier frequency to the surface of the earth by electrical conduction, receiving the reference and indicating portions of the carrier frequency at the surface of the earth, amplifying at the surface of the earth the indicating portions of the carrier frequency as a function of the reference portions of the carrier frequency and displaying a value which is a function of the amplified indicating portions of the carrier frequency.

3. An apparatus for logging wells comprising, in combination, a power supply means for producing an alternating current adapted to be placed at the surface of the earth, an electrical conductor adapted to connect the power supply to the ground, a container arranged for movement along the axis of the borehole, a cable comprising a single insulated conductor arranged to suspend the container and to be mounted on a rotatable reel for moving the container along the bore of the well, an electrical connection between the power supply and the upper end of said cable, first generating means mounted in the container generating during one-half cycle of the alternating current a carrier frequency which has a frequency substantially greater than that of the alternating current produced by the power supply means, means mounted on said container arranged to modify the said carrier frequency with varying earth characteristics of the borehole to constitute an indicating signal, second generating means mounted in the container generating during the other one-half cycle of the alternating current a carrier frequency to constitute a reference signal of the same frequency as the indicating signal wholly free from varying earth characteristics, means electrically connecting the first and second generating means with the lower end of the insulated conductor of the cable, an amplifying means at the surface of the earth electrically connected to said insulated conductor and arranged to receive the carrier frequency and amplify the indicating portions thereof in inverse proportion to the amplitude of the reference portions thereof, whereby the amplified indicating portions of the carrier frequency are free from varying attenuation effects which would otherwise result from the varying unrolled length of cable, and means electrically connected to said amplifier for displaying a signal which is a function of the amplified, indicating portions of the carrier frequency.

4. Apparatus for logging comprising, in combination, a means for producing power in the form of alternating current adapted to be arranged at the surface of the earth, a container arranged for movement along the axis of a borehole, first generating means mounted in said container arranged to generate during one-half of a cycle of the power supply frequency a carrier frequency having a frequency substantially greater than that of the alternating current, means mounted on said container arranged to modify said carrier frequency in accordance with varying earth characteristics of the borehole to constitute an indicating signal, second generating means mounted in said container arranged to generate during the remaining half cycle of the power supply frequency a frequency free from varying earth characteristics of the borehole to constitute a reference signal of the same frequency as the indicating signal, receiving means for receiving said indicating and reference signals of the surface of the earth, electrical conducting means arranged to connect the power supply with the first and second generating means and for connecting the first and second generating means with the receiving means, an amplifying means electrically connected to said receiving means arranged to amplify the indicating signal and to control the magnitude of the amplification as a function of the reference signal of the carrier frequency and a means for displaying a signal electrically connected to said amplifying means.

5. Apparatus for logging boreholes comprising, in combination, a cable provided with a single insulated conductor, a container suspended from the lower end of said cable for movement along the axis of the borehole, power supply means for supplying power in the form of an alternating current, an electrical conductor adapted to connect the power supply means to the ground, means electrically connecting the power supply means with the upper end of said cable, a first and second oscillator and modulator unit in said container, each unit generating a carrier frequency and being divided into a first section generating the carrier frequency only during one-half of each cycle of the alternating current and a second section generating the carrier frequency during the other one-half of each cycle of said alternating current, a first and a second pick-up means mounted on the container, an electrical connection between the first pick-up means and the first oscillator and modulator section of the first oscillator and modulator unit, an electrical connection between the second pick-up means and the first section of the second oscillator and modulator unit, a first combining means in said container arranged to combine the output of the first and second section of said oscillator and modulator unit, a second combining means in said container arranged to combine the output of the first and second sections of the second oscillator and modulator unit, electrical connections between each combining means and the lower end of said single insulated conductor, a first demodulator tuned to said first oscillator and modulator unit arranged to modify the portion of the carrier frequency generated by the first section as a function of the portion of carrier frequency generated by the second section of the first oscillator, a second demodulator at the surface of the earth tuned to said second oscillator and modulator unit and arranged to modify the portion of the carrier frequency generated by the first section as a function of the portion of the carrier frequency produced by the second section of the second oscillator and electrical conductors connecting each demodulator with the upper end of said single insulated conductor.

6. In the logging of a borehole, the steps of producing power in the form of an alternating current at the surface of the earth and transmitting said current into a borehole, employing said current within the borehole to produce a carrier frequency of a substantially greater frequency than the alternating current, modifying within the borehole the carrier frequency generated during one-half of each cycle of said alternating current in accordance with a characteristic of said borehole to constitute an indicating signal, maintaining the carrier frequency generated during the other half of each cycle of said alternating current wholly free from varying earth characteristics to constitute a reference signal, transmitting the indicating and reference portions of the carrier frequency to the surface of the earth and there displaying a signal which is a function of the indicating portions of the carrier frequency and the reference portions of the carrier frequency.

WHITMAN D. MOUNCE.

REFERENCES CITED

The following references are of record in the file of this patent:

UNITED STATES PATENTS

| Number | Name | Date |
|---|---|---|
| 2,255,754 | Beers | Sept. 16, 1941 |
| 2,288,876 | Arnold | July 7, 1942 |
| 1,928,970 | Johnston | Oct. 3, 1933 |
| 2,288,278 | Howell | June 30, 1942 |
| 2,298,794 | Howell | Oct. 13, 1942 |
| 1,928,969 | Kuffel | Oct. 3, 1933 |
| 2,295,738 | Gillbergh | Sept. 15, 1942 |
| 1,999,215 | Smith | Apr. 30, 1935 |
| 2,132,807 | Rust, et al. | Oct. 11, 1938 |
| 2,220,070 | Aiken | Nov. 5, 1940 |
| 2,271,951 | Pearson, et al. | Feb. 3, 1942 |
| 2,222,136 | Bazzoni, et al. | Nov. 19, 1940 |